(12) United States Patent
Werny

(10) Patent No.: US 9,382,982 B2
(45) Date of Patent: Jul. 5, 2016

(54) GUIDE DEVICE FOR AN ENDLESS TORQUE-TRANSMITTING MEANS OF A BELT-DRIVEN CONICAL-PULLEY TRANSMISSION

(71) Applicant: Schaeffler Technologies AG & Co. KG, Herzogenaurach (DE)

(72) Inventor: Pierre Werny, Souffelweyersheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/415,435

(22) PCT Filed: Jun. 21, 2013

(86) PCT No.: PCT/EP2013/062973
§ 371 (c)(1),
(2) Date: Jan. 16, 2015

(87) PCT Pub. No.: WO2014/012741
PCT Pub. Date: Jan. 23, 2014

(65) Prior Publication Data
US 2015/0176684 A1    Jun. 25, 2015

(30) Foreign Application Priority Data
Jul. 17, 2012  (DE) .................. 10 2012 212 472

(51) Int. Cl.
| | | |
|---|---|---|
| *F16H 7/18* | (2006.01) | |
| *F16H 7/08* | (2006.01) | |
| *F16H 9/18* | (2006.01) | |
| *F16H 9/12* | (2006.01) | |

(52) U.S. Cl.
CPC .................. *F16H 7/18* (2013.01); *F16H 9/125* (2013.01); *F16H 9/18* (2013.01)

(58) Field of Classification Search
CPC .............. F16H 7/18; F16H 2007/0872; F16H 2007/0874; F16H 9/18; F16H 2007/0804
USPC .................................................. 474/111, 140
See application file for complete search history.

(56) References Cited

U.S. PATENT DOCUMENTS

| | | | | |
|---|---|---|---|---|
| 4,826,468 | A * | 5/1989 | Friedrichs ................. | F16H 7/08 474/101 |
| 4,850,314 | A * | 7/1989 | Villa ......................... | F16H 7/24 123/90.31 |
| 6,129,644 | A * | 10/2000 | Inoue .................... | F16H 7/0836 474/101 |
| 6,435,994 | B1* | 8/2002 | Friedmann ................ | F16H 7/18 474/111 |
| 6,796,917 | B2* | 9/2004 | Konno ...................... | F16H 7/18 474/111 |

(Continued)

FOREIGN PATENT DOCUMENTS

| | | |
|---|---|---|
| DE | 100 17 005 A1 | 10/2000 |
| DE | 10 2009 019 069 A1 | 11/2009 |
| WO | WO 2007/068229 A1 | 6/2007 |

*Primary Examiner* — Henry Liu
(74) *Attorney, Agent, or Firm* — Alfred J. Mangels

(57) ABSTRACT

A guide device for guiding an endless torque-transmitting member of a belt-driven, conical-pulley transmission. The device includes an outer guide section, and an inner guide section that is spaced from the outer guide section and between which guide sections the endless torque-transmitting member is guidable in a direction of travel of that member. The device is formed from two halves that are connected to each other by a plug-in and slide connection arrangement, in order to improve the guide device structurally, functionally, and from a producibility standpoint.

8 Claims, 4 Drawing Sheets

(56) References Cited

U.S. PATENT DOCUMENTS

| | | | | |
|---|---|---|---|---|
| 6,832,966 B2* | 12/2004 | Kawano | F16H 7/18 474/111 |
| 6,884,192 B2* | 4/2005 | Konno | F16H 7/18 474/111 |
| 7,354,364 B2* | 4/2008 | Glas | F16H 59/36 474/140 |
| 8,057,336 B2* | 11/2011 | Wodtke | F16H 7/18 474/111 |
| 8,376,883 B2* | 2/2013 | Inoue | F16H 9/24 474/109 |
| 2005/0096167 A1* | 5/2005 | Konno | F16H 7/18 474/111 |
| 2006/0247080 A1* | 11/2006 | Wigsten | F16H 7/08 474/111 |
| 2007/0037646 A1* | 2/2007 | Markley | F16H 7/0829 474/111 |
| 2007/0190830 A1 | 8/2007 | Wodtke et al. | |
| 2011/0152019 A1 | 6/2011 | Gantner et al. | |
| 2011/0244999 A1* | 10/2011 | Nakamura | F16H 9/18 474/91 |
| 2012/0295747 A1* | 11/2012 | Ishikawa | F16H 7/18 474/140 |
| 2013/0090201 A1* | 4/2013 | Mori | F16H 7/18 474/140 |
| 2014/0235390 A1* | 8/2014 | Urbanek | F16H 7/18 474/140 |

* cited by examiner

GUIDE DEVICE FOR AN ENDLESS TORQUE-TRANSMITTING MEANS OF A BELT-DRIVEN CONICAL-PULLEY TRANSMISSION

CROSS-REFERENCE TO RELATED APPLICATION

This application is the U.S. national phase application under 35 U.S.C. §371 of International Application Serial No. PCT/EP2013/062973, having an international filing date of 21 Jun. 2013, and designating the United States, which claims priority based upon German Patent Application No. DE 10 2012 212 472.1, filed on 17 Jul. 2012, the entire contents of each of which applications are hereby incorporated by reference herein to the same extent as if fully rewritten.

BACKGROUND OF THE INVENTION

1. Field of the Invention

The present invention relates to a guide device for an endless torque-transmitting means of a belt-driven conical-pulley transmission, having a first guide section and a second guide section spaced apart from the first guide section, between which the endless torque-transmitting means is guidable in a direction of travel.

2. Description of the Related Art

From German patent publication DE 100 17 005 A1 a transmission is known, such as a continuously adjustable, belt-driven, conical-pulley transmission. The transmission includes a first conical disk pair and a second conical disk pair, each disk pair having one axially movable and one axially fixed conical disk, and an endless torque-transmitting means for torque transmission situated between the conical disk pairs. A receiving rail is provided to at least partially receive the endless torque-transmitting means, in order to improve the transmission relative to its manner of operation, in particular with regard to the acoustic properties, and to keep the construction of the transmission and the assembly as simple as possible. That German published application discloses a receiving rail which has a U-shaped contour in cross section. In that case, the strand is on only one side of the receptacle, while there is a free space on the other side. The endless torque-transmitting means can be inserted through the opening. That receiving rail is designed in a single piece.

From German patent publication No. DE 10 2011 081 481.7 a guide device is known for an endless torque-transmitting means of a belt-driven, conical-pulley transmission, the guide device having a first guide section and a second guide section that is spaced apart from the first guide section. Between the guide sections the endless torque-transmitting means is guidable in a direction of travel, the guide sections having a longitudinal direction which corresponds to the direction of travel of the endless torque-transmitting means, a transverse direction perpendicular thereto, and lateral edge sections which delimit the guide sections in the transverse direction. At least one guide section has at least one longitudinal rib which extends in the longitudinal direction, and which is positioned apart from the edge sections. According to that German patent application the guide device is designed as a two-part guide rail. One guide rail half has a locating pin, a locating pin receptacle, a latching hook and a latching bow to connect with a second guide rail half.

From German patent application No. DE 10 2012 203 077.8 a guide device is known for an endless torque-transmitting means of a belt-driven, conical-pulley transmission having a first guide section and a second guide section which is spaced apart from the first guide section, between which the endless torque-transmitting means is guidable in a direction of travel, in which the guide device has a guide module and a stiffening module with at least one stiffening core. According to that German patent application, the guide module is designed as a two-part guide rail having two guide rail halves. The guide rail is divided in the longitudinal direction into the two guide rail halves. The guide rail halves each have a locating pin, a locating pin receptacle, a latching hook and a latching bow to connect with the other guide rail half.

An object of the present invention is to structurally and/or functionally improve a guiding device identified at the beginning. In particular, a connection between the halves of the guide device is to be simplified, a reliable connecting system is to be created, and producibility of the halves of the guide device is to be simplified.

SUMMARY OF THE INVENTION

The object is achieved with a guide device for an endless torque-transmitting means of a belt-driven, conical-pulley transmission having a first guide section and a second guide section which is spaced apart from the first guide section, between which the endless torque-transmitting means is guidable in a direction of travel, in which the guide device has two halves that are connected to each other with the help of a plug-in and slide connection.

The transmission ratio of the belt-driven conical-pulley transmission can be continuously adjustable. The belt-driven conical-pulley transmission can be a continuously variable transmission (CVT), and can be a variator transmission. Additionally, the belt-driven, conical-pulley transmission can be positioned in a drivetrain of a motor vehicle and can have a first conical pulley pair and a second conical pulley pair. The conical pulley pairs can have parallel axes of rotation and each conical pulley pair can have one axially fixed conical disk and one axially movable conical disk. The axially movable conical disks of the conical pulley pairs can be movable in opposite directions. The first conical pulley pair can be drivable by means of an input drive that can be an internal combustion engine. An output drive can be connectible by means of the second conical pulley pair. The endless torque-transmitting means can serve to transmit mechanical power between the first conical pulley pair and the second conical pulley pair. The belt-driven conical-pulley transmission can have a housing and conical disks can be supported in the housing.

The endless torque-transmitting means may can be a traction medium that can be a chain. The chain can be a plate-link chain having plates and pressure members. The pressure members can serve to couple the endless torque-transmitting means with the conical pulley pairs. A coupling between the pressure members and the conical pulley pairs can occur by frictional engagement, and the plates can serve to couple the pressure members. The endless torque-transmitting means can have a load strand and a slack strand.

In operation, vibrations in a transverse direction be induced in the load strand and/or in the slack strand of the endless torque-transmitting means. A transverse direction can be a direction that is perpendicular to the travel direction of the endless torque-transmitting means and to the axes of rotation of the conical pulley pair. The endless torque-transmitting means can assume a running position independent of a transmission ratio of the belt-driven conical-pulley transmission. The running position of the endless torque-transmitting means can change with a change in the transmission ratio of the belt-driven conical-pulley transmission.

With the guide device, the endless torque-transmitting means can be guidable on a load strand. With the guide device, the endless torque-transmitting means can be guidable on a slack strand. The endless torque-transmitting means can be guidable at the first guide section and at the second guide section in a transverse direction. The endless torque-transmitting means can be guidable at least nearly free of clearance between the first guide section and the second guide section. The endless torque-transmitting means can slide in operation at the first guide section and/or at the second guide section. At the first guide section, the endless torque-transmitting means can be guidable by its inner side. An inner side of the endless torque-transmitting means can be a side facing the axes of rotation of the conical pulley pair. At the second guide section, the endless torque-transmitting means can be guidable by its outer side. An outer side of the endless torque-transmitting means can be a side facing away from the axes of rotation of the conical pulley pair.

The guide device can have a joining plane that extends in the travel direction of the endless torque-transmitting means. The joining plane can be positioned perpendicular to the axes of rotation of the conical disks. The halves of the guide device can be connected to each other along the joining plane. The halves can each have a mating surface and can have their mating surfaces resting against each other. The guide device can have a first half and a second half.

The first guide section can be divided along the joining plane. The first guide section can be divided along the joining plane into a first part and a second part. The first part of the first guide section can be formed with the first half of the guide device. The second part of the first guide section can be formed with the second half of the guide device. The second guide section can be divided along the joining plane into a first part and a second part. The first part of the second guide section can be formed with the first half of the guide device, and the second part of the second guide section can be formed with the second half of the guide device.

The first part of the first guide section and the first part of the second guide section can be connected to each other with the help of a first connecting section of the guide device. The first half of the guide device can have the first part of the first guide section, the first part of the second guide section, and the first connecting section. The first half of the guide device can be produced in a single piece. The second part of the first guide section and the second part of the second guide section can be connected to each other with the help of a second connecting section of the guide device. The second half of the guide device can have the second part of the first guide section, the second part of the second guide section, and the second connecting section. The second half of the guide device can be produced in a single piece.

The plug-in and slide connection can serve to connect the halves in a form-locked manner. The plug-in and slide connection can serve to connect the halves in a pretensioned, form-locked manner. The plug-in and slide connection can serve to connect the halves directly in a form-locked manner. The plug-in and slide connection can be connectible through plugging and subsequent sliding. The plug-in and slide connection can be connectible through plugging the two halves together and subsequently moving the two halves relative to each other. The plug-in and slide connection can be connectible through plugging the two halves together in the extension direction of the axes of rotation of the conical disks and subsequently moving the two halves relative to each other in the extension direction of the joining plane.

With the guide device according to the invention, assembly is simplified. The guide device has increased strength. Process reliability in assembly is increased, and testing of pulling-out force can be omitted. Assembly problems are avoided. Formation of gaps between the halves is avoided. A connection between the halves has increased reliability. Producibility of the guide device is simplified. Holding force between the halves is increased.

The plug-in and slide connection can have at least one rigid, hook-shaped first connecting element and at least one second connecting element with a receiving section and an undercut section. The plug-in and slide connection can have two rigid hook-shaped first connecting elements and two second connecting elements, each having a receiving section and an undercut section.

The at least one first connecting element can be designed as a rigid, L-shaped hook. The at least one first connecting element can project beyond a mating surface of the particular half in a plug-in direction of the plug-in and slide connection. The at least one second connecting element can be designed as an L-shaped cutout formed with two side sections, where one side section can form the receiving section, and on the other side section the undercut section can be formed. To join the plug-in and slide connection, in each case a rigid, L-shaped hook can be introduced into the receiving section of a cutout, and subsequently, through moving the halves, the rigid, L-shaped hook can be moved to the undercut section, so that releasing the plug-in and slide connection contrary to the plug-in direction of the plug-in and slide connection is prevented by a positive lock.

The halves of the guide device can have at least one first connecting section and at least one second connecting section. The halves can each have exactly one first connecting section and exactly one second connecting section.

At least one half can have at least one detent element which is effective in a plug-in direction of the plug-in and slide connection, to lock the halves to each other in a connected position. The at least one detent element can project beyond the mating surface of a half. The at least one detent element can catch elastically and can be a latching finger. Each of the halves can have at least one detent element, which can correspond to at least one detent element of the other half. The detent elements can be oriented opposite to each other.

The halves of the guide device can be designed identically, at least with regard to their connecting sections. The halves of the guide device can be designed at least approximately identically.

In summary, and portrayed in other words, the invention thus yields, among other things, a one-click guide rail. The guide rail can be symmetrical. The guide rail can have four hooks, four corresponding holes, and two clips (for 2 halves). Assembly can be accomplished through two steps: 1. The two halves can first be united on the chain; 2. The two halves can then be moved relative to each other in the direction of travel, so that they are located opposite each other. A click ensures that an assembly has occurred. The design can be characterized by the following points: a pulling-out force is significantly increased, and it can be possible to omit measuring; the guide rail has fewer elements and is then easier to produce; a gap between the tongues can be reduced; an erroneous assembly is unlikely, because there is no clip on the mating surface; a single click ensures a correct assembly.

"Can" or "may" designate in particular optional features of the invention. Accordingly, in each case there is one exemplary embodiment of the invention which has the particular feature or particular features.

BRIEF DESCRIPTION OF THE DRAWINGS

Exemplary embodiments of the invention will be described in greater detail below in reference to drawing figures. That description will yield additional features and advantages. Concrete features of those exemplary embodiments can depict general features of the invention. Features of those exemplary embodiments combined with other features can also represent individual features of the invention.

The figures show the following, schematically and by way of example.

DESCRIPTION OF THE PREFERRED EMBODIMENTS

Figure 1:
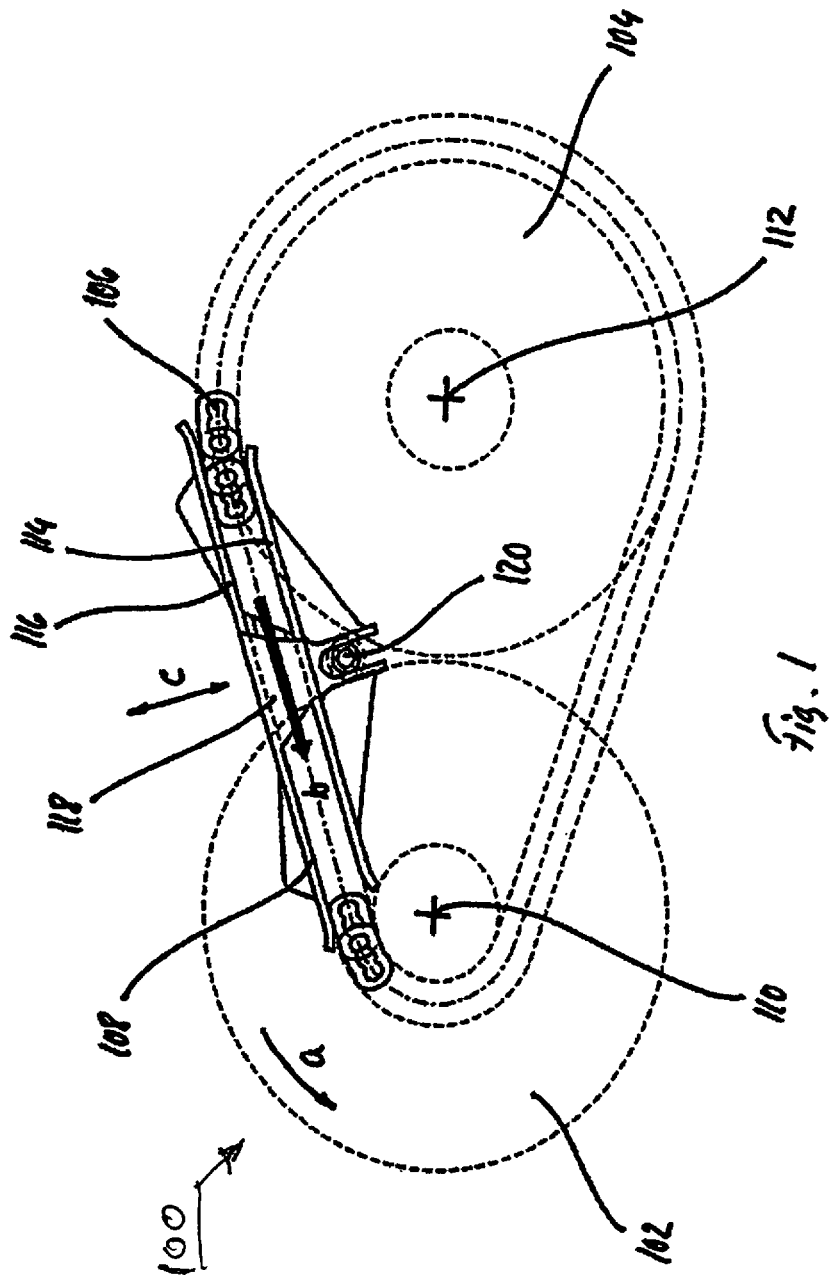
FIG. 1 is a side view of a continuously variable transmission having two conical disk pairs, a chain, and a two-part guide rail to guide the chain.

FIG. 1 shows a continuously variable transmission 100 having two conical disk pairs 102, 104, a chain 106, and a guide rail 108 to guide the chain 106. The conical disk pair 102 is drivable starting from a motor vehicle internal combustion engine. An axis of rotation of the conical disk pair 102 is identified as 110. The arrow direction a shows a direction of drive rotation. The conical disk pair 104 can be drive-connected to driving wheels of the motor vehicle. An axis of rotation of the conical disk pair 104 is identified as 112. The chain 106 serves to transmit mechanical power between the conical disk pair 102 and the conical pulley 104. In the figure, the chain 106 runs on a small radius on the conical pulley 102 and on a large radius on the conical pulley pair 104. That results in a transmission ratio change in the slower direction in the present case.

The conical disks of the conical pulley pairs 102, 104 are movable relative to each other in the direction of the axes of rotation 110, 112. If the conical disks of a conical pulley pair 102, 104 are far apart from each other, the chain 106 runs on a small radius. If the conical disks of a conical pulley pair 102, 104 have a small distance between them, the chain 106 runs on a large radius. If the distance between the conical disks is increased, the running radius of the chain 106 shifts in the direction of smaller radii. If the distance between the conical disks is decreased, the running radius of the chain 106 shifts in the direction of larger radii. The conical disks of the conical pulley pair 102, 104 are adjusted in opposite directions, so that the chain 106 remains pre-tensioned. When the transmission ratio of the transmission 100 is changed, the relative position between the chain 106 and the axes 110, 112 of the conical pulley pair 102, 104 changes.

With an input drive corresponding to arrow direction a, the chain 106 runs in arrow direction b. The guide rail 108 is then positioned on a load strand of the chain 106. The guide rail 108 has an inner guide section 114 and an outer guide section 116. The guide sections 114, 116 are connected to each other by connection sections, such as 118. The chain 106 is guided between the guide sections 114, 116 with only a small clearance. The guide rail 108 is positioned on a support tube 120. The support tube 120 is firmly positioned on a housing of the transmission 100, and thus in fixed relation to the axes 110, 112 of the conical pulley pairs 102, 104. For the disposition on the support tube 120, the guide rail 108 has a receptacle in the shape of an elongated hole. During operation of the transmission 100, vibrations can be induced in a transverse direction c in the chain 106. The elongated-hole-shaped receptacle of the guide rail 108 extends in arrow direction c. In order to enable a change in position of the chain 106 when the transmission ratio of the transmission 100 changes, the guide rail 108 is situated on the support tube 120 so that it is pivotable about a longitudinal axis of the support tube 120, and is movable in arrow direction c. The guide-rail 108 has a two-part structure.

Figure 2:
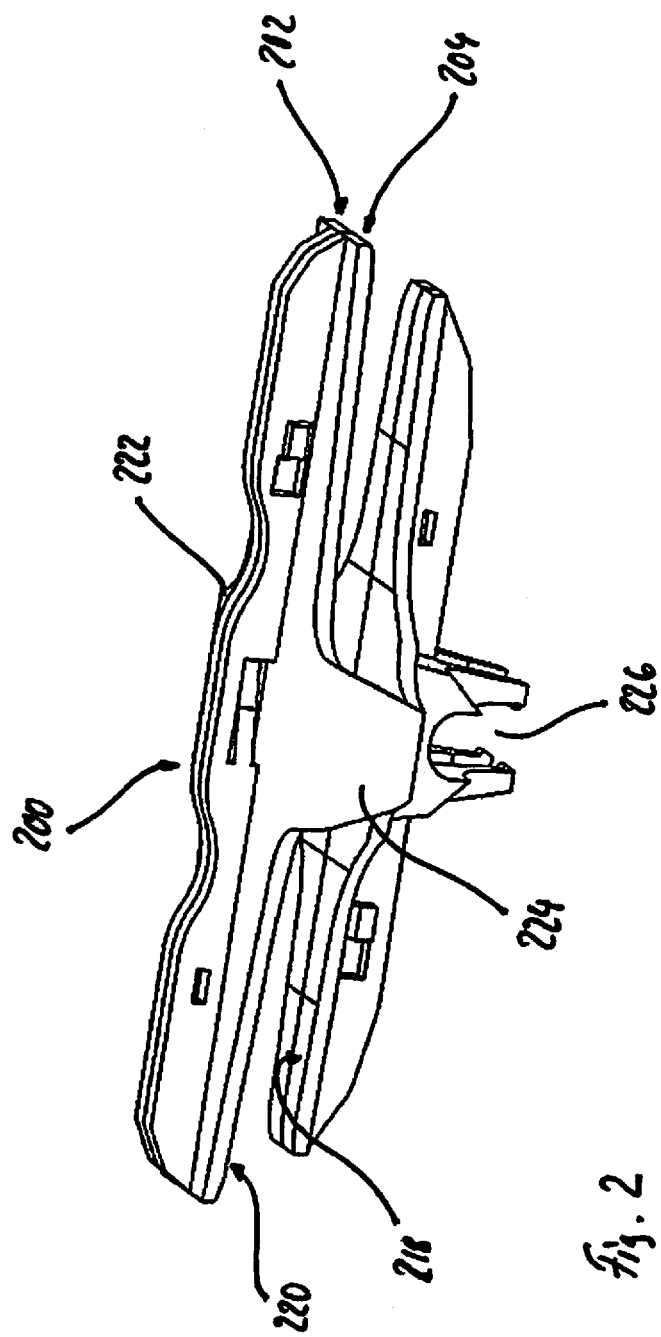
FIG. 2 is a perspective view of a two-part guide rail having a first guide rail half and a second guide rail half, which are connected to each other by a plug-in and slide connection.
Figure 3:
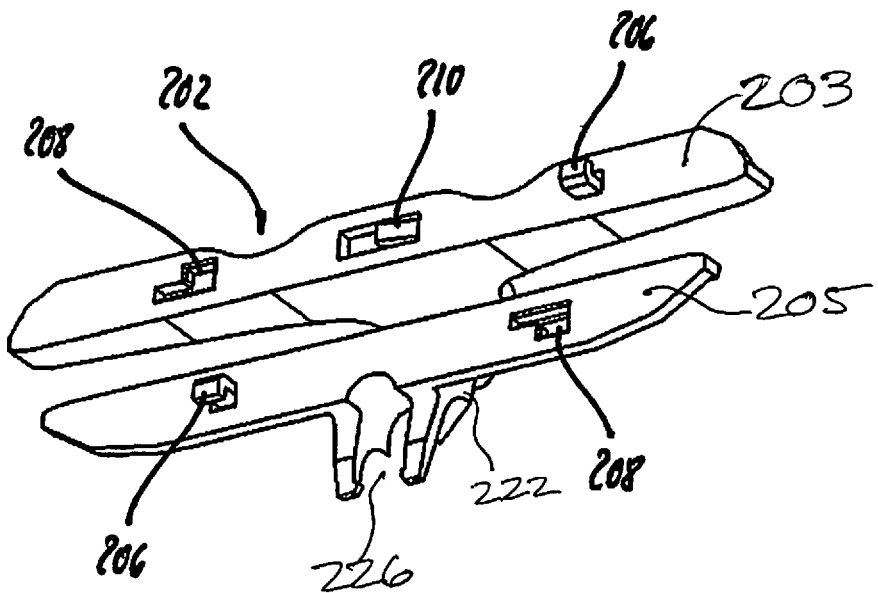
FIG. 3 is a perspective view of a first guide rail half, with hooks, cutouts, and a latching finger.
Figure 4:
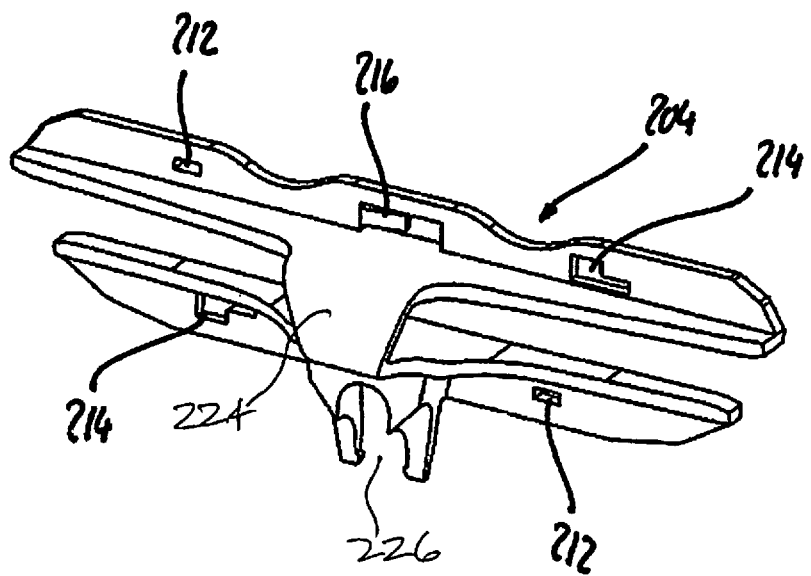
FIG. 4 is a perspective view of a second guide rail half, with hooks, cutouts, and a latching finger.
Figure 5:
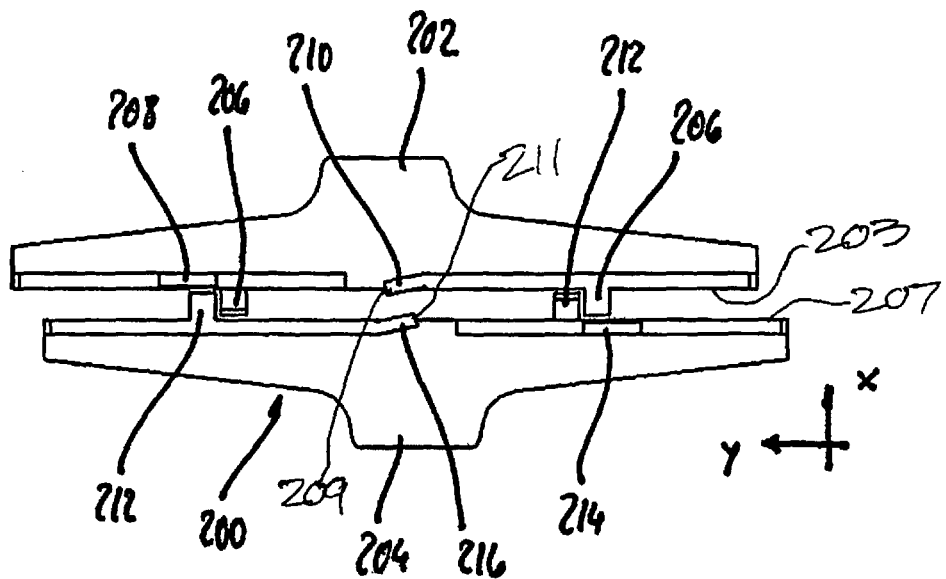
FIG. 5 is a top view of a first guide rail half and a second guide rail half before joining.
Figure 6:
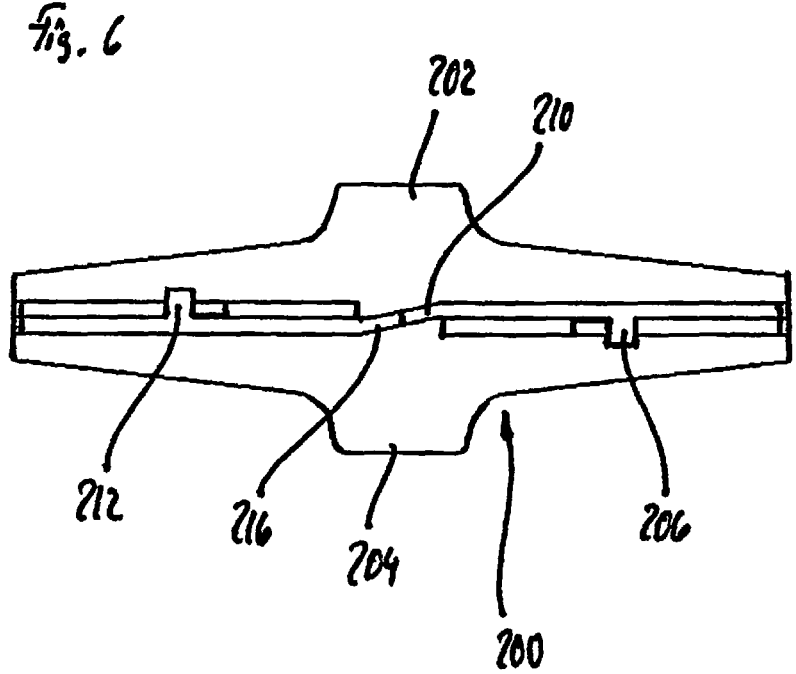
FIG. 6 is a top view of a first guide rail half and a second guide rail half in a joined state.

FIG. 2 shows a two-part guide rail 200 having a first guide rail half 202 and a second guide rail half 204, which are connected to each other by a plug-in and slide connection arrangement. FIG. 3 shows the first guide rail half 202 with hooks 206, cutouts 208, and latching finger 210. FIG. 4 shows the second guide rail half 204 with hooks 212, cutouts 214, and latching finger 216. FIG. 5 shows the first guide rail half 202 and the second guide rail half 204 before they are joined. FIG. 6 shows the first guide rail half 202 and the second guide rail half 204 in a joined state.

The guide rail 200 has an inner guide section 218, an outer guide section 220 and connecting sections 222, 224. The inner guide section 218 has an inner guide surface for a chain, such as chain 106 shown in FIG. 1. The outer guide section 220 has an outer guide surface for the chain. The guide rail 200 is divided in the longitudinal direction into the two guide rail halves 202, 204. As shown in FIG. 3, guide rail half 202 has a part of the inner guide section 218, a part of the outer guide section 220, and the connecting section 222. As shown in FIG. 4, guide rail half 204 has a part of the inner guide section 218, a part of the outer guide section 220, and the connecting section 224. The guide sections 218, 220 are kept apart from each other by the connecting sections 222, 224. The connecting sections 222, 224 are each narrower at their ends assigned to the inner guide section 218 than at their ends assigned to the outer guide section 220. With their respective facing inner surfaces, the connecting sections 222, 224 each form a lateral guide for the sides of a chain. The inner guide section 218 serves to guide the radially inner surfaces of the chain. The outer guide section 220 serves to guide the radially outer surfaces of the chain. A receptacle 226 for connecting with a support tube, such as support tube 120 shown in FIG. 1, is provided on the inner guide section 218 and on the outer guide section 220.

As shown in FIGS. 3 and 4, guide rail halves 202, 204 are each produced in a single piece. The guide rail halves 202, 204 are each made of a synthetic material, for example a polyamide, possibly with a glass fiber filling, and are each produced by an injection molding process. The guide rail halves 202, 204 are connected to each other with the help of a plug-in and slide connection. The plug-in and slide connection has hooks 206, 212, cutouts 208, 214 and latching fingers 210, 216.

Referring to FIG. 3, guide rail half 202 includes connection surfaces 203, 205 for connecting to corresponding, opposed surfaces of the guide rail half 204. The guide rail half 202 has on its surfaces 203, 205 two hooks 206, two cutouts 208, and one latching finger 210. The hooks 206 are situated on respective surfaces 203, 205 of the guide rail half 202, and project outwardly from the respective mating surface. The cutouts 208 are also situated on respective surfaces 203, 205 of the guide rail half 202. Positioned on connection surface 205 of the guide rail half 202, and in spaced relationship along connection surface 205, are a hook 206 and a cutout 208. Positioned on the outer guide section of the guide rail half 202 are a hook 206, a cutout 208, and the latching finger 210. The positions of hook 206 and the cutout 208 on connection surface 205 of the guide rail half 202, and the positions of hook 206 and the cutout 208 on connection surface 203 of the guide rail half 202 are spatially interchanged relative to each other. The latching finger 210 is positioned between the hook 206 and the cutout 208 on connection surface 203 of the guide rail half 202.

Referring to FIG. 4, and similar to guide rail half 202, guide rail half 204 has connection surfaces 207, 209 for connection to corresponding opposed connection surfaces 203, 205 of the guide rail half 202. The guide rail half 204 includes on its connection surfaces 207, 209 two hooks 212, two cutouts 214, and one latching finger 216. The hooks 212 are situated on each of connection surfaces 207, 209 of the guide rail half 204, and project outwardly from the respective surfaces. The cutouts 214 are also situated on the respective connection surfaces 207, 209 of the guide rail half 204. Positioned on connection surface 207 of the guide rail half 204, and in spaced relationship along connection surface 209, are a hook 212 and a cutout 214. Positioned on connection surface 207 of the guide rail half 204, and in spaced relationship along connection surface 207, are a hook 212, a cutout 214, and the latching finger 216. The positions of hook 212 and the cutout 214 on connection surface 209 of the guide rail half 204, and the positions of hook 212 and the cutout 214 on connection surface 207 of the guide rail half 204 are spatially interchanged relative to each other. The latching finger 216 is positioned between the hook 212 and the cutout 214 on connection surface 207 of the guide rail half 204.

The hooks 206, 212 each have an L-shaped cross section with a first leg and a second leg. The first legs extend outwardly of and at right angles to the respective connection surface. The second legs extend from an outer end of the respective first legs and are positioned at right angles to the first legs. The second legs are directed away from the mating planes of the guide sections 218, 220, starting from the first legs. The second legs are situated at a distance from the respective connection surfaces of the guide rail half 202, 204, and extend parallel to the respective connection surfaces. The second legs define an outer face of the hooks 206, 212, which are of rigid design.

The cutouts 208, 214 are of L-shaped form, with a first section and a second section. The first sections of the cutouts 208, 214 correspond in shape to the faces of the second legs of the hooks 206, 212. The second sections of the cutouts 208, 214 extend along connection surfaces 203, 205, 207, 209, and correspond in shape to a cross section of the first legs of the hooks 206, 214.

As shown in FIGS. 5 and 6, latching fingers 210, 216 each have a free outer end 209, 211, respectively, which extends outwardly relative to the respective connection surfaces of the guide rail halves 202, 204. The latching fingers 210, 216 extend in opposite directions relative to the connection surfaces and are connected to the respective guide rail halves 202, 204 in such a way that their free ends can be deflected inward and outward relative to the respective connection surface. The free ends of the latching fingers 210, 216 point in the sliding direction of the plug-in and slide connection and form ramp surfaces, which serve to bring about an inward deflection of the latching fingers 210, 216. The free ends of the latching fingers 210, 216 are positioned approximately centered on the respective guide rail halves 202, 204 in the sliding direction of the plug-in and slide connection.

The guide rail halves 202, 204 are of similar overall design when viewed while facing their respective connection surfaces, at least with regard to the arrangement of the hooks 206, 212, the cutouts 208, 214 and the latching fingers 210, 216.

When the guide rail halves 202, 204 are positioned with their respective connection surfaces opposite to and facing each other, the hooks 206 and the cutouts 214, the hooks 212 and the cutouts 208, and the latching finger 210 and the latching finger 216 are each opposite each other.

In order to connect the guide rail halves 202, 204 to each other so that their respective connection surfaces extend as shown in assembled form in FIG. 6, the guide rail halves 202, 204 are first positioned facing each other in the x-axis direction shown in FIG. 5. The hooks 206 are introduced with their second legs extending into the first sections of the cutouts 214 and the hooks 212 with their second legs extending into the first sections of the cutouts 208, until the respective connection surfaces of the guide rail halves 202, 204 are touching each other. Next, the guide rail halves 202, 204 are moved relative to each other in the y-axis direction shown in FIG. 5, so that the hooks 206, 212 with their first legs are moved along the second sections of the cutouts 208. The guide rail halves 202, 204 are moved relative to each other in the y-axis direction shown in FIG. 5, until the latching fingers 210, 216 latch with their free ends against each other as shown in FIG. 6. The latching engagement of the latching fingers 210, 216 is acoustically and tactilely perceptible. That movement in the y-axis direction forms a positive lock between the second legs of the hooks 206, 212 and edge sections of the first sections of the cutouts 214, so that the guide rail halves 202, 204 are connected to each other. Detachment of the guide rail halves 202, 204 from each other is not possible when the outermost ends of the latching fingers 210, 216 are in the positions shown in FIG. 6. The guide rail halves 202, 204 can be detached from each other when the outer ends of the latching fingers 210, 216 are deflected toward their respective connection surfaces of the guide rail halves and are moved in the y-axis direction that is opposite from the connection movement direction, so that the guide rail halves can be moved apart and detached from each other.

What is claimed is:

1. A guide device for guiding an endless torque-transmitting member of a belt-driven, conical-pulley transmission, said guide device comprising:
    a first guide section, and
    a second guide section spaced from the first guide section and between which guide sections the endless torque-transmitting member is guided in a direction of travel,
    wherein the guide device includes first and second guide device halves that are connected to each other by a plug-in and slide connection arrangement, wherein the first and second guide device halves each include respective pairs of connection surfaces that each include respective connection elements arranged so that the guide device halves are assembled by initially moving the guide device halves toward each other to bring into contact their respective opposed connection surfaces and to engage respective opposed connection elements on the respective connection surfaces, and after contact of the respective connection surfaces the guide device halves are thereafter moved relative to each other in the direction of travel of the endless torque-transmitting member a predetermined distance to define a complete and assembled torque-transmitting member guide device.

2. The guide device according to claim 1, wherein the plug-in and slide connection arrangement includes as a connection element at least one rigid, hook-shaped first connection element that extends outwardly from a respective guide device half connection surface, and wherein the plug-in and slide connection arrangement includes as a connection element at least one second connection element formed in a respective guide device half connection surface and defined by an open receiving section for receiving a hook-shaped first connection element, and an open undercut section for allowing the hook-shaped first connection element to move within the undercut section as the guide device halves are moved relative to each other in the direction of travel of the endless torque-transmitting means.

3. The guide device according to claim 2, wherein the at least one first connection element is a rigid, L-shaped hook that is engageable with a respective second connection element.

4. The guide device according to claim 2, wherein the at least one second connection element is an L-shaped opening having two interconnected open sections, wherein a first open section defines a receiving section for receiving a respective first connection element, and includes a second open section that defines the undercut section to allow sliding movement of a respective first connection element therewithin in the direction of travel of the endless torque-transmitting means.

5. The guide device according to claim 1, wherein each of the guide section halves has at least one first connection element and at least one second connection element.

6. The guide device according to claim 1, wherein the guide section halves each include at least one detent element, wherein the detent elements of the guide section halves are engageable with each other and are effective in a sliding direction of the plug-in and slide connection elements relative to each other in the direction of travel of the endless torque-transmitting means to latch the guide section halves to each other in a connected condition.

7. The guide device according to claim 1, wherein each of the guide section halves includes at least one detent element that corresponds in shape with at least one detent element of the other guide section half, and wherein the detent elements are engageable with each other to connect the guide section halves and to retain the guide section halves in connected condition.

8. The guide device according to claim 1, wherein the guide device halves of the guide device each include identical first and second connection elements, and wherein respective first connection elements of the first guide section half engage with respective second connection elements of the second guide section half, and respective second connection elements of the first guide section half engage with respective first connection elements of the second guide section half to facilitate engagement of and to retain engagement of the guide section halves when assembled to define a complete guide device.

* * * * *